United States Patent Office 3,495,807
Patented Feb. 17, 1970

3,495,807
DEVICES FOR HOMOGENISING EMULSIONS AND SUSPENSIONS OR MIXTURES THEREOF
John Shields, Newcastle upon Tyne, John Edward Goodman and Arthur Grange, Shipley, and Thomas Archbold, Whitley Bay, England, assignors to Sir Howard Grubb Parsons & Company Limited, Newcastle upon Tyne, England and Ultrasonics Limited, Shipley, England, both British companies
Filed Sept. 25, 1967, Ser. No. 670,260
Claims priority, application Great Britain, Sept. 28, 1966, 43,257/66
Int. Cl. B01f 11/02
U.S. Cl. 259—2      6 Claims

ABSTRACT OF THE DISCLOSURE

A device for homogenising emulsions and suspensions or mixtures thereof, which comprises a resonant probe and means for producing longitudinal vibration of the probe at sonic or ultrasonic frequencies, the probe having a chamber located in the region of the anti-nodal plane on the probe for receiving a sample of an emulsion or suspension or mixture thereof to be homogenised.

---

This invention relates to devices for homogenising emulsions and suspensions or mixtures thereof.

The process of homogenising such fluids involves the breaking down of the particle size of constituents in the disperse phase within the emulsion or suspension. Thus in the case of milk, for example, the process of homogenising the milk involves the breaking down of the particles size of fat globules.

According to the present invention, a device for homogenising emulsions and suspensions or mixtures thereof, comprises a resonant probe and means for producing longitudinal vibration of the probe at sonic or ultrasonic frequencies, the probe having a chamber located in the region of the anti-nodal plane on the probe for receiving a sample of an emulsion or suspension or mixture thereof to be homogenised.

Such a device is particularly suitable for the homogenising of milk prior to analysis by intra-red techniques to determine the constituents thereof, for example, as disclosed in British Patent 989,617.

The chamber may be flexibly secured to the end of the probe or may be rigidly attached thereto or be incorporated wholly or partly within the probe.

In one embodiment of the invention the fluid to be homogenised is fed into and removed from the chamber via passages extending longitudinally through the probe, inlet and outlet connections to said passages being located in a nodal plane of the said probe.

Figure 1:
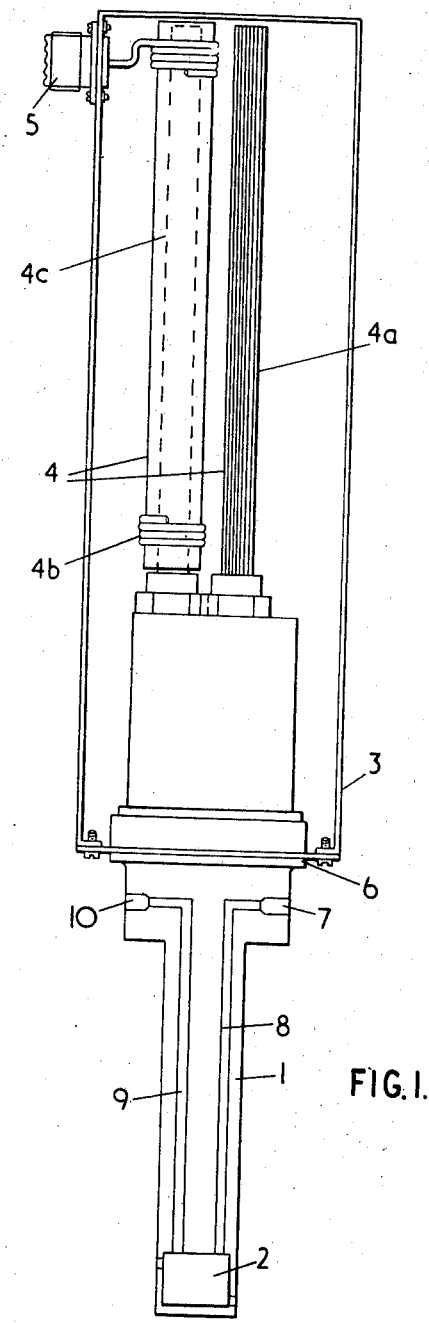
Figure 2:
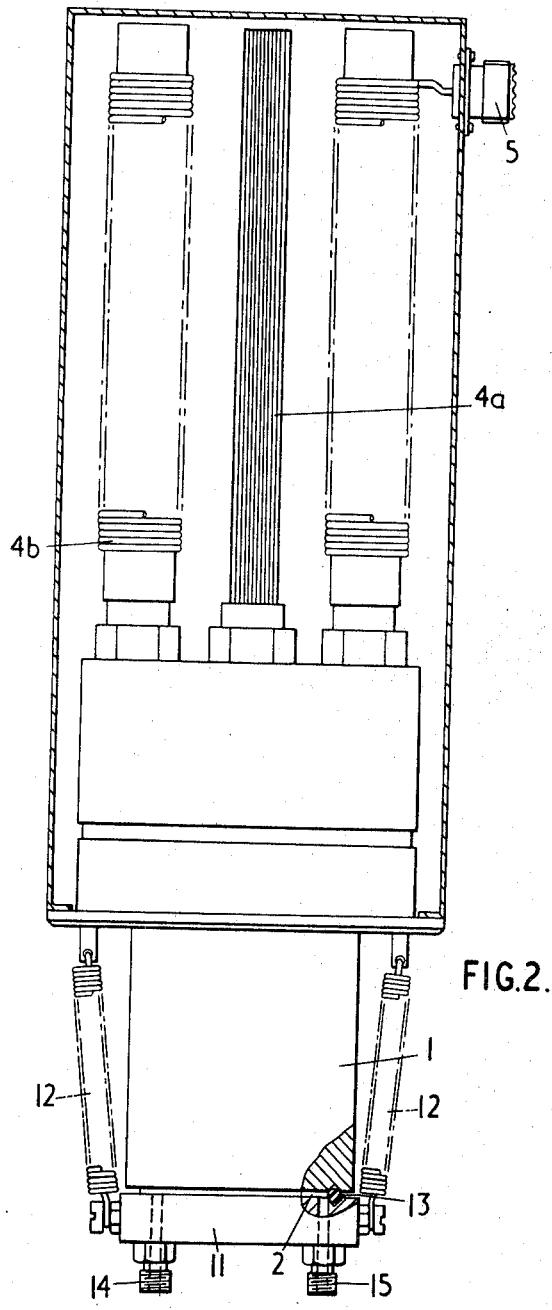

The invention also consists in a device for homogenising emulsions and suspensions or mixtures thereof substantially as described below with reference to the accompanying drawings in which:

FIGURE 1 shows a typical homogenising device in accordance with one embodiment of the invention; and FIGURE 2 shows an alternative embodiment of the invention.

In carrying the invention into effect in the form illustrated by way of example in FIGURE 1, a device is shown suitable for homogenising milk prior to analysis by infrared techniques as described in British Patent 989,617. The device comprises a probe 1 having a chamber 2 at one end thereof. The other end of the probe passes into a casing 3 and is connected to means 4 for inducing longitudinal vibrations in the probe at sonic or ultrasonic frequencies.

The means 4 comprise magnetostrictive transducers each in the form of a laminated core 4a surrounded by an excitation coil 4b. A suitable material for the core is nickel and the excitation coil may consist of copper coils mounted on a former 4c. The coils 4b are connected through connection 5 to a continuous wave generator (not shown) the frequency of which can be varied.

The generator feeds electrical energy to the transducers which in turn induce longitudinal vibration in the assembly of probe 1 and laminated cores 4a. A typical generator has an output of 100 watts at about 20 kilocycles per second with the frequency variable within a band of 100 cycles per second.

The probe is chosen so that its length is equivalent to a half wave length for sound of a chosen frequency (typically about 20 kc./sec.) transmitted through the probe end. At a nodal plane in the probe, it is clamped by means of flange 6 to casing 3. The ends of the probe lie in antinodal planes and the probe and transducers form a resonant assembly vibrating at between 10 and 30 kilocycles per second typically about 20 kilocycles per second when connected to a generator having the characteristics quoted in the preceding paragraph.

The number of transducers used will depend on circumstances, but in the form described six transducers are used. The use of a stepped probe 1, as shown, has the advantage of increasing the energy density available at the probe end in contact with the milk.

Milk is introduced to chamber 2 through inlet 7 which is preferably located as near as possible to the nodal plane so as to reduce effects of vibration on the inlet. From inlet 7, the milk enters passage 8 through which it passes to chamber 2.

In chamber 2, the milk is in contact with the end face of probe 1 and vibrations are transmitted to the milk producing cavitation therein. The cavitation effect reduces the size of fat globules in the disperse phase in the milk and provides the degree of homogenisation required for the application of the analytical method described in British Patent 989,617.

The milk after a desired residence time in the chamber 2, leaves via passage 9 and outlet 10. As in the case of inlet 7, it is preferable to locate outlet 10, as near as possible to the nodal plane.

FIGURE 2 shows such an arrangement in more detail. A member 11 is flexibly mounted in spaced relation to the end of the probe 1. The member 11 is held in position by springs 12 of which there may be three or more as circumstances demand. The member 11 is spaced from the end of the probe by a flexible sealing ring 13 located in grooves formed in the end of the probe and in the member 11. Milk or other fluid to be homogenised can enter chamber 2 which is formed between member 11 and the end of the probe through an inlet 14 in the member 11 and leaves the chamber 2 through an outlet 15 in the member 11.

The chamber 2 may be located at the end of the probe or be wholly within the end of the probe, as shown, or partly within the end of the probe and the size of the chamber must be chosen so that there is sufficient quantity of milk present at any time to prevent violent foaming of the milk whereby the milk becomes isolated by bubbles from the end of the probe.

The reduction in the size of the fat globules is related to the milk flow rate. For a given size of chamber, the lower the flow rate, the greater is the reduction in the size of the fat globules because of increased residence time in the chamber 2.

The particular form of transducer and generator described is given by way of example only and the length and cross-section of the probe, the frequency of vibra-

We claim:

1. A device for homogenising emulsions and suspensions or mixtures thereof, which device comprises a resonant probe having an end face, means for producing longitudinal vibrations of the probe at a frequency in the range of sonic and ultrasonic frequencies, a flat member, means resiliently mounting said flat member in spaced relation to the end face of the probe, including a flexible sealing ring engaging the end face of the probe and the said member and thereby defining a sealed chamber located in the region of an anti-nodal plane and bounded on one side by the end face of the probe, and means defining an inlet and outlet for said sealed chamber for liquid to be homogenised.

2. A device as claimed in claim 1, in which the said means resiliently mounting said flat member includes springs which connect the flat member to a flange located on the probe at a nodal plane thereof.

3. A device as claimed in claim 1, in which the said inlet and outlet comprise ducts in the member extending parallel to the axis of the probe.

4. A device as claimed in claim 1, wherein the probe is arranged to vibrate at a frequency of between 10 and 30 kilocycles per second.

5. A device as claimed in claim 4, wherein the probe is arranged to vibrate at a frequency of about 20 kilocycles per second.

6. A device as claimed in claim 1, wherein the vibrations are produced by magnetostrictive transducers.

References Cited

UNITED STATES PATENTS

| | | |
|---|---|---|
| 3,165,299 | 1/1965 | Balamuth et al. |
| 3,198,489 | 8/1965 | Finch. |
| 3,301,535 | 1/1967 | Brown. |
| 3,357,684 | 12/1967 | Kunnen _____ 259—72 |

FOREIGN PATENTS 650,434   10/1962   Canada.

WALTER A. SCHEEL, Primary Examiner

J. M. BELL, Assistant Examiner

U.S. Cl. X.R.

259—1